(12) United States Patent
Park et al.

(10) Patent No.: US 8,684,451 B1
(45) Date of Patent: Apr. 1, 2014

(54) FRONT VEHICLE BODY STRUCTURE

(71) Applicant: Hyundai Motor Company, Seoul (KR)

(72) Inventors: Ki Bong Park, Seoul (KR); Log Won Do, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/708,788

(22) Filed: Dec. 7, 2012

(30) Foreign Application Priority Data

Oct. 2, 2012 (KR) .......................... 10-2012-0109732

(51) Int. Cl.
*B62D 25/08* (2006.01)

(52) U.S. Cl.
USPC ....................................... 296/203.02; 296/30

(58) Field of Classification Search
USPC ............. 296/30, 198, 193.09, 187.09, 203.02
See application file for complete search history.

(56) References Cited

U.S. PATENT DOCUMENTS

| 6,598,933 B2* | 7/2003 | Taguchi et al. .......... 296/203.02 |
| 7,219,954 B2* | 5/2007 | Gomi et al. ............. 296/203.02 |
| 2010/0066124 A1* | 3/2010 | Terada et al. ............ 296/187.09 |

FOREIGN PATENT DOCUMENTS

| JP | 2005-350015 A | 12/2005 |
| JP | 2008-001149 A | 1/2008 |
| JP | 2009-023424 (A) | 2/2009 |
| KR | 10-1998-036164 A | 8/1998 |

* cited by examiner

*Primary Examiner* — Joseph Pape
*Assistant Examiner* — Dana Ivey
(74) *Attorney, Agent, or Firm* — Morgan, Lewis & Bockius LLP

(57) ABSTRACT

A front vehicle body structure may include a front side member extending in a longitudinal direction of a vehicle, a fender apron upper member disposed in an outer direction of the front side member in a traverse direction of the vehicle, and a fender apron front reinforcement member extending in the traverse direction of the vehicle and connecting the fender apron upper member and the front side member.

7 Claims, 3 Drawing Sheets

FRONT VEHICLE BODY STRUCTURE

CROSS-REFERENCE TO RELATED APPLICATION

The present application claims priority to Korean Patent Application No. 10-2012-0109732 filed on Oct. 2, 2012, the entire contents of which is incorporated herein for all purposes by this reference.

BACKGROUND OF THE INVENTION

1. Field of the Invention

The present invention relates to a front vehicle body structure of a vehicle.

2. Description of Related Art

A front body vehicle of a vehicle includes a front end module which is disposed at a front side of an engine room in a longitudinal direction of the vehicle and to which a cooling module, head lamps, and the like are mounted, and a left side member and a right side member disposed at both left and right sides of the front end module along a traverse direction of the vehicle while extending in the longitudinal direction of the vehicle, respectively.

Left and right portions of a bumper beam extending in the traverse direction of the vehicle are mounted to front tip ends of the left side member and the right side member in the longitudinal direction of the vehicle through crash boxes.

The bumper beam is formed to be longer than an interval between the left side member and the right side member, and when the left and right portions of the bumper beam are mounted to the left side member and the right side member, the bumper beam has a left outer portion and a right outer portion protruding toward an outer side of the left side member and the right side member in the traverse direction of the vehicle.

A part of the front end module and a fender apron member are positioned while being spaced apart from both side outer portions at rear sides of the left outer portion and the right outer portion of the bumper beam in the longitudinal direction of the vehicle.

In the aforementioned front vehicle structure in the related art, when a vicinity of the left outer portion of the bumper beam or a vicinity of the right outer portion of the bumper beam is crashed into an object or another vehicle (hereinafter, referred to as a crashed object), crash energy is not effectively distributed to other portions of the vehicle body.

That is, when the left side member or the right side member is front offset crashed by 25% into the crashed object (hereinafter, referred to as a small offset crash), the left side member or the right side member is bent toward the engine room by the crashed object, and the fender apron member is crashed into the crashed object, so that the crash energy is not effectively distributed to other portions of the vehicle body.

Accordingly, it is necessary to enhance structural strength of the front vehicle body portion positioned at a rear side of the left outer portion and the right outer portion of the bumper beam.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body structure having advantages of improving front offset crash response performance of a vehicle by directly connecting fender apron front reinforcement members positioned at rear sides of a left outer portion and a right outer portion of a bumper beam and mounting a stay for enhancing connection strength of a connection portion between the fender apron front reinforcement member and the side member.

In an aspect of the present invention, a front vehicle body structure may include a front side member extending in a longitudinal direction of a vehicle, a fender apron upper member disposed in an outer direction of the front side member in a traverse direction of the vehicle, and a fender apron front reinforcement member extending in the traverse direction of the vehicle and connecting the fender apron upper member and the front side member.

The fender apron front reinforcement member may include a fender apron front reinforcement front member, and a fender apron front reinforcement rear member, wherein the fender apron front reinforcement front member and the fender apron front reinforcement rear member are coupled to each other to form a shape of a hollow quadrangular beam.

A bumper beam disposed in the traverse direction of the vehicle is mounted to the front side member, wherein the fender apron front reinforcement member is disposed at a rear side of the bumper beam in the longitudinal direction of the vehicle.

A crash box is mounted to the front side member between the bumper beam and the fender apron front reinforcement member.

The front side member may include an inner surface and an outer surface in the traverse direction of the vehicle, wherein the fender apron front reinforcement front member may include a first end connected to the fender apron upper member and a second end to which the front side member is fitted while passing through the second end and which is attached to the inner surface of the front side member, and wherein the fender apron front reinforcement rear member may include a second end attached to the fender apron upper member and a first end attached to the outer surface of the front side member.

A passing-through coupling hole is formed at the second end of the fender apron front reinforcement front member and the front side member is fitted to the coupling hole to be coupled thereto.

The second end of the fender apron front reinforcement front member may include a perpendicularly bent flange, wherein the flange is attached to the inner surface of the front side member in a state that the front side member is fitted to the coupling hole of the second end of the fender apron front reinforcement front member to be coupled thereto.

A front end module is fastened to an entire surface of the fender apron front reinforcement front member in the longitudinal direction of the vehicle while overlapping the entire surface of the fender apron front reinforcement front member.

The front vehicle body structure may further include a stay connecting the first end of the fender apron front reinforcement rear member and the outer surface of the front side member.

The first end of the fender apron front reinforcement rear member is connected to the outer surface of the front side member at a predetermined angle, wherein the stay is connected to each of the first end of the fender apron front reinforcement rear member and the outer surface of the front side member at a predetermined angle, so that the first end of the fender apron front reinforcement rear member, the outer surface of the front side member, and the stay are formed in a triangular shape.

The stay is formed in a shape of a quadrangular flat plate, and may include a bead extending in a longitudinal direction of the stay.

According to the front vehicle body structure according to the exemplary embodiment of the present invention, the fender apron front reinforcement members positioned at the rear sides of the left outer portion and the right outer portion of the bumper beam are directly connected to the side members, and the stay for enhancing strength of a connection portion between the fender apron front reinforcement member and the side member is mounted.

Accordingly, when the vehicle is small overlap crashed into a crashed object during travelling in a front direction, the fender apron front reinforcement member reduces crash energy by receiving and absorbing the crash energy, and effectively distributes the crash energy to the left side member or the right side member, thereby improving cash response performance of the front vehicle body.

Further, the front vehicle body structure is simple, so that it is possible to decrease the number of components and weight compared to the corresponding front vehicle body reinforcement structure in the related art.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
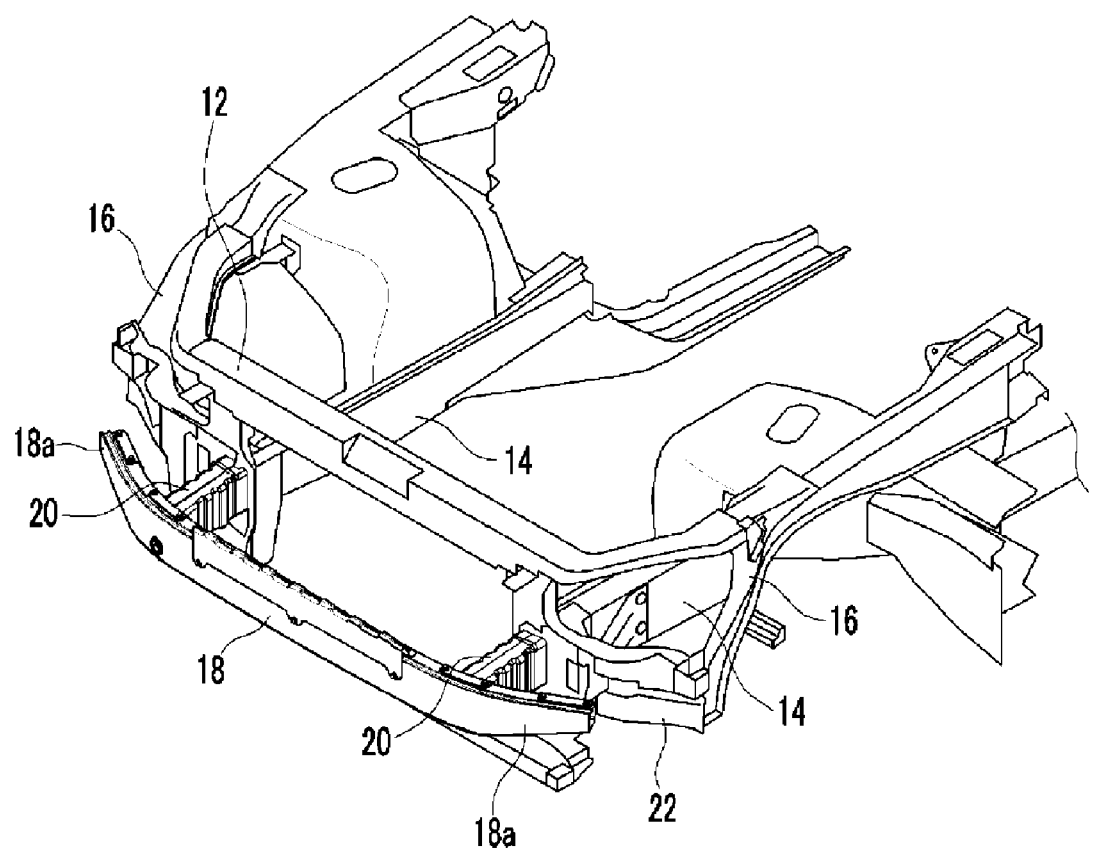
FIG. 1 is a perspective view of a front vehicle body according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Referring to FIG. 1, a front vehicle body according to an exemplary embodiment of the present invention includes a front end module 12, front side members 14, and fender apron upper members 16.

The front end module 12 extends in a traverse direction of a vehicle and includes an opening at a center portion in the traverse direction so that a cooling module and the like is installed therein.

A bumper beam 18 is disposed at a front side of the front end module 12 according to the longitudinal direction of the vehicle.

The bumper beam 18 is formed in a beam shape extending in the traverse direction of the vehicle.

Both left and right side portions of the bumper beam 18 according to the traverse direction of the vehicle are mounted to the front side members 14 through crash boxes 20 to be supported.

The bumper beam 18 includes outer portions 18a further extending outwardly than the front side members 14 in the traverse direction of the vehicle.

The front side members 14 extend in the longitudinal direction of the vehicle, and are disposed at both left and right sides while being spaced apart from each other at a predetermined interval in the traverse direction of the vehicle.

The fender apron upper members 16 are disposed at outer sides of the front side members 14 according to the traverse direction of the vehicle and upper portions according to a height direction of the vehicle.

Fender apron front reinforcement members 22 are connected to front tip ends of the fender apron upper members 16 according to the longitudinal direction of the vehicle.

The fender apron front reinforcement member 22 extends in the traverse direction of the vehicle while facing the front side member 14.

Figure 2:
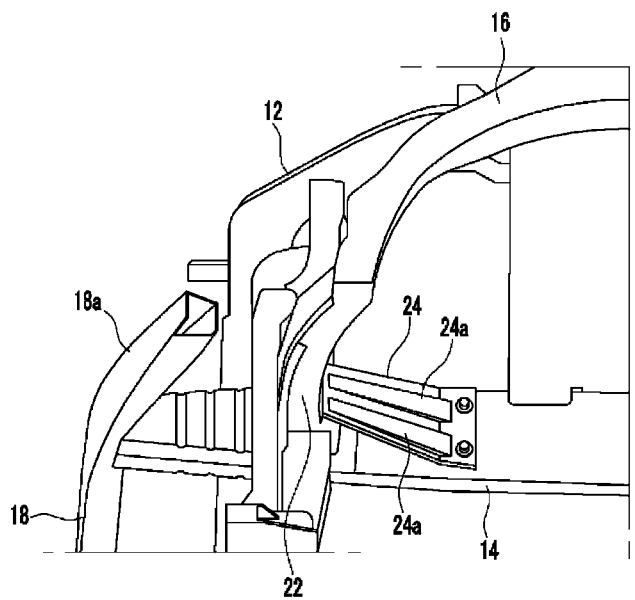
FIG. 2 is a side perspective view of a front vehicle body according to an exemplary embodiment of the present invention.
Figure 3:
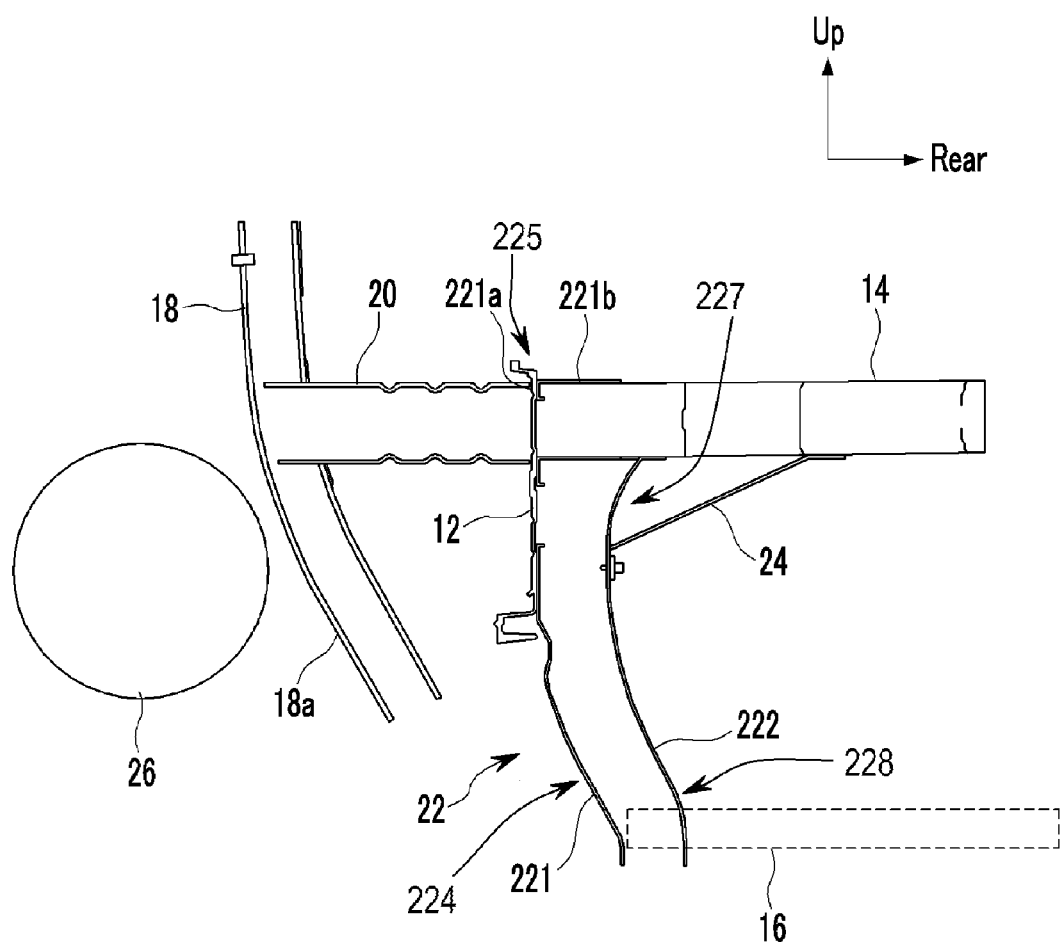
FIG. 3 is a cross-sectional view taken along line A-A of FIG. 1.

Referring to FIGS. 2 and 3, a second end of the fender apron front reinforcement member 22 according to the traverse direction of the vehicle is connected to the fender apron upper member 16 and a first end of the fender apron front reinforcement member 22 according to the traverse direction of the vehicle is connected to the front side member 14.

The fender apron front reinforcement member 22 is disposed at a rear side of an outer portion 18a of the bumper beam 18 in the longitudinal direction of the vehicle.

The fender apron front reinforcement member 22 includes a fender apron front reinforcement front member 221 and a fender apron front reinforcement rear member 222.

The fender apron front reinforcement front member 221 and the fender apron front reinforcement rear member 222 are coupled to each other to be generally formed in a shape of a hollow quadrangular beam.

The front side member 14 includes an outer surface and an inner surface according to the traverse direction of the vehicle.

The fender apron front reinforcement front member 221 extends from the fender apron upper member 16 to the front side member 14 in the traverse direction of the vehicle.

The fender apron front reinforcement front member 221 includes a second end 225 and a first end 224 according to the traverse direction of the vehicle.

The first end 224 of the fender apron front reinforcement front member 221 is connected to the fender apron upper member 16, and the second 225 of the fender apron front reinforcement front member 221 is connected to the front side member 14.

A passing-through coupling hole 221a is formed at the second end 225 of the fender apron front reinforcement front member 221, and the front side member 14 is fitted to the coupling hole to be coupled.

The second end 225 of the fender apron front reinforcement front member 221 includes a perpendicularly bent flange 221b. The flange 221b is attached to an inner surface of the front side member 14 in a state where the front side member 14 is fitted to the coupling hole of the second 225 of the fender apron front reinforcement front member 221 to be coupled.

The fender apron front reinforcement rear member 222 extends from the fender apron upper member 16 to the front side member 14 in the traverse direction of the vehicle.

The fender apron front reinforcement rear member 222 includes a first end 227 and a second end 228 according to the traverse direction of the vehicle.

The second end 228 of the fender apron front reinforcement rear member 222 is attached to the fender apron upper member 16 and the first end 227 of the fender apron front reinforcement rear member 222 is attached to the outer surface of the front side member 14.

An entire surface of the fender apron front reinforcement front member 221 according to the longitudinal direction of the vehicle is fastened to the front end module 12 with a bolt while overlapping the front end module 12, but may be connected to the front end module 12 by a welding method and the like.

A stay 24 is attached while connecting the first end 227 of the fender apron front reinforcement rear member 222 and the outer surface of the front side member 14.

One tip end of the stay 24 is fastened to the outer surface of the front side member 14 with a bolt to be connected, and the other tip end of the stay 24 is fastened to the first end 227 of the fender apron front reinforcement rear member 222 with a bolt to be connected, but the one tip end of the stay 24 may be attached to the outer surface of the front side member 14, and the other tip end of the stay 24 may be attached to the first end 227 of the fender apron front reinforcement rear member 222 by welding.

The first end 227 of the fender apron front reinforcement rear member 222 is connected to the outer surface of the front side member 14 at a predetermined angle, and the stays 24 are connected to the first end 227 of the fender apron front reinforcement rear member 222 and the outer surface of the front side member 14 at a predetermined angle, respectively, so that the first end 227 of the fender apron front reinforcement rear member 222, the outer surface of the front side member 14, and the stay 24 are generally formed in a shape of a triangle.

The stay 24 may be formed in a shape of a quadrangular flat plate.

The stay 24 includes a plurality of beads 24a extending in a longitudinal direction thereof and flanges fastened while being in close contact with the first end 227 of the fender apron front reinforcement rear member 222 and the outer surface of the front side member 14.

The bead 24a serves to enhance strength in the longitudinal direction of the stay 24.

When the vehicle is 25% front offset crashed with the crashed object, such as a barrier 26, around an outer portion 18a of the bumper beam 18, that is, the vehicle is small overlap crashed, the outer portion 18a of the bumper beam 18 is bent toward the rear side according to the longitudinal direction of the vehicle and the front side member 14 is also bent toward the engine room.

When the crash continues, the barrier 26 is crashed into the fender apron front reinforcement member 22, and the fender apron front reinforcement member 22 absorbs crash energy, so that the crash energy is reduced.

Further, since the fender apron front reinforcement member 22 is connected to the front side member 14 and is strongly supported to the front side member 14 by the stay 24, the crash energy applied to the fender apron front reinforcement member 22 is transferred to the front side member 14 and the fender apron to be effectively distributed to other portions of the vehicle, thereby improving front offset crash response performance of the front vehicle body according to the exemplary embodiment of the present invention.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body structure, comprising:
   a front side member extending in a longitudinal direction of a vehicle;
   a fender apron upper member disposed next to the front side member; and
   a fender apron front reinforcement member extending in a traverse direction of the vehicle and being connected to the fender apron upper member and the front side member,
   wherein the fender apron front reinforcement member includes:
     a fender apron front reinforcement front member; and
     a fender apron front reinforcement rear member wherein the fender apron front reinforcement front member and the fender apron front reinforcement rear member are coupled to each other;
   wherein the front side member includes an inner surface and an outer surface in the traverse direction of the vehicle;
   wherein the fender apron front reinforcement front member includes:
     a first end connected to the fender apron upper member; and
     a second end through which the front side member passes and which is attached to the inner surface of the front side member; and
   wherein the fender apron front reinforcement rear member includes:
     a second end attached to the fender apron upper member; and
     a first end attached to the outer surface of the front side member;
   a stay connecting the first end of the fender apron front reinforcement rear member and the outer surface of the front side member; and wherein the first end of the fender apron front reinforcement rear member is connected to the outer surface of the front side member at a predetermined angle; and wherein the stay is connected to each of the first end of the fender apron front reinforcement rear member and the outer surface of the front side member at a predetermined angle, so that the first end of the fender apron front reinforcement rear member, the outer surface of the front side member, and the stay are formed in a triangular shape.

2. The front vehicle body structure of claim 1, wherein a bumper beam disposed in the traverse direction of the vehicle is mounted to the front side member; and wherein the fender apron front reinforcement member is disposed at a rear side of the bumper beam in the longitudinal direction of the vehicle.

3. The front vehicle body structure of claim 2, wherein a crash box is mounted to the front side member between the bumper beam and the fender apron front reinforcement member.

4. The front vehicle body structure of claim 1, wherein the first end of the fender apron front reinforcement front member includes a passing-through coupling hole and the front side member is coupled to the fender apron front reinforcement front member through the coupling hole.

5. The front vehicle body structure of claim 1, wherein the first end of the fender apron front reinforcement front member includes a flange, and wherein the flange is attached to the inner surface of the front side member while the front side member is coupled to the coupling hole of the first end of the fender apron front reinforcement front member.

6. The front vehicle body structure of claim 5, wherein a front end module is fastened to the fender apron front reinforcement front member in the longitudinal direction of the vehicle while overlapping the fender apron front reinforcement front member.

7. The front vehicle body structure of claim 1, wherein the stay is shaped of a quadrangular plate, and includes a bead extending in a longitudinal direction of the stay.

\* \* \* \* \*